Figure 1:
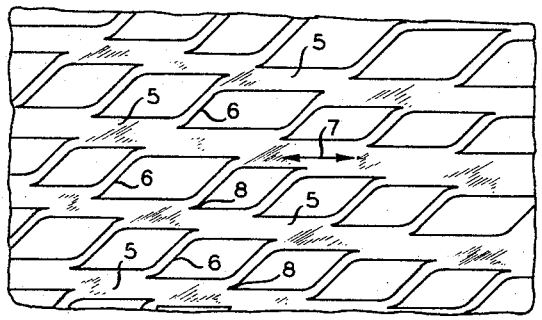

INVENTOR.
OLE-BENDT RASMUSSEN
BY Young & Quigg
ATTORNEYS

United States Patent Office 3,345,242
Patented Oct. 3, 1967

3,345,242
FIBER PRODUCT HAVING A BRANCHED RETICULAR OR NETLIKE STRUCTURE, AND A METHOD AND APPARATUS FOR THE PRODUCTION THEREOF
Ole-Bendt Rasmussen, Copenhagen, Denmark, assignor to Phillips Petroleum Company, a corporation of Delaware
Filed Sept. 3, 1963, Ser. No. 306,078
Claims priority, application Denmark, Sept. 7, 1962, 3,916/62
6 Claims. (Cl. 161—109)

The invention relates to a fiber product having a branched, reticular or netlike structure which is produced by a partial splitting off of an oriented film made from a thermoplastic resin.

It is known that after an orienting by stretching, orientable films of thermoplastic resins, such as polyalkylenes, for example, polyethylene, polyamides, for example, nylon, polycarbonates and polyvinyl alcohol, may be split into individual fibers or into a network of coherent fibers by a mechanical treatment, including an ultrasonic treatment or a splitting from within by means of a bursting agent, which is incorporated in the material.

It is also known, that the splitting process can be promoted by previously treating the film with a swelling agent for the film material, and that in order to obtain a fine and uniform fiber product, it is expedient to carry out the splitting process in two steps by first producing a series of microscopic fissures or splits in the material before the proper splitting is carried out.

Further, it is known to distend a partly split fiber product into an open-meshed state and to fix it in said state, for example, by heat treatment of the product.

The incomplete splitting aims at obtaining a product of great porosity and flexibility, and for this purpose the splitting process should be carried out by using so intensive a treatment of the oriented film that the fibrous network becomes quite fine meshed, and the single fibers so thin that their maximal thickness does not exceed the thickness of the film, and is perferably less than the latter. This is necessary because it is difficult or not at all possible in the known processes to make the microstructure of the particular split product uniform, since the branching of the fibers will tend to proceed in various directions from point to point of the product. Therefore, a yarn produced from said product will be fairly inhomogenous and not particularly flexible, unless the individual fibers are exceedingly fine. This, however, would substantially reduce the breaking strength of the product.

It is the object of the present invention to produce a fiber product, having great porosity and flexibility in combination with good strength properties, and this is accomplished, according to the invention, if the fiber product consists of proportionately long and broad stem fibers being pairwise connected by proportionately short and thin, substantially parallel branch fibers, the ends of which are branched off in opposite directions by a unidirectional scaling down from each side of the two stem fibers being connected by the branch fibers.

Being substantially rectilinear, the proportionately long and solid stem fibers give the product a good strength. The branch fibers keep the stem fibers mutually separated thus ensuring a good porosity, and the uniform disposition of the branch fibers makes the product extraordinarily flexible.

The porosity is further improved in a special embodiment of a fiber product according to the invention, in which the tendency of continuing the splitting off of the branch fibers from the stem fibers has been eliminated by changing the direction of orienting of the fibrous material at the vicinity of the splitting notches. Thereby, the branch fibers are fixed to a certain extent in a direction deviating rather much from the longitudinal direction of the stem fibers being connected by the said branch fibers, and the said stem fibers are spaced further apart.

In the ideal state, which can be very nearly reached, the stem fibers are continuous and substantially rectilinear with a longitudinal direction which, on account of the one-sided scaling off of the branch fibers, forms a very small angle with the direction of orienting of the material, the said stem fibers forming together with the branch fibers an open-meshed netlike structure having rhomboid to nearly rectangular openings.

This makes the fiber product well suited for use as an unwoven textile material, a suitable number of layers being combined, for example, by spot welding until the product has the desired thickness.

It is also possible, for example by an ultrasonic treatment, to disrupt the branch fibers, thus obtaining a product consisting of stem fibers with outsticking ends of branch fibers and having a wooly character.

The special structure, which is characteristic for the product of the invention, is obtained by carrying out the splitting process in a manner differing to a certain extent from the known processes. One of the more appropriate of the known splitting processes consists in sandwiching a film material, which has been oriented by stretching, and has subsequently been treated to produce a suitable number of microscopic splits or pores, between two belts of elastic material, for example rubber, and distending these belts at right angles to the direction of orienting of the film material. As formerly stated, this results in a fiber product having a branched, netlike structure in which, however, the directions of the branch fibers are varying.

If, according to the invention, the method is changed so that simultaneously with the distending, a dislocation in the longitudinal direction takes place from point to point across the width of the elastic belts, the splitting will proceed uniformly and result in the desired product.

This can be carried out in the manner that while being distended transversely, the elastic belts are being allowed to contract in length, the oriented film being sandwiched in such manner between the belts, that its direction of orienting forms a small angle to the longitudinal direction of the belts. Accordingly, the film will be subjected to a unidirectional splitting force everywhere in a direction a little bit different from that of the orienting, and the splitting off of the branch fibers is obtained in the scaling down manner which is characteristic for the fiber products of the invention.

In order to obtain the greatest possible uniformity of the splitting forces, close lying threads of a substantially inelastic material, for example cotton threads, may be incorporated in the elastic belts, said threads forming an acute angle, for example 45°, to the longitudinal direction of the belts. This ensures that the distension and the contraction proceed uniformly over the whole width of the belts.

The best fiber products according to the invention are obtained by using a film which has been so strongly oriented that it has obtained a high degree of cleavability. Aiming at obtaining particularly fine branch fibers, it is further expedient that microscopic split or pores are produced in the oriented film in order to form points of departure for the splitting. Microscopic splits or pores of the said kind can be formed in known manner by finely dispersing substances in the film material which can be brought to exert a pressure or which can be leached to leave hollow spaces. The said microscopic splits or pores may also be produced in known manner by means of an initial stretching of the film in a particularly rigid state, as by low temperature or in a strongly dehydrated state.

Moreover, the formation of fine fibers can be promoted by subjecting the film material to a swelling process in known manner.

The invention further comprises apparatus for the production of the present fiber product, said apparatus consisting of two endless elastic belts being kept pressed against one another, said belts having incorporated in elastic threads, if desired, and being carried by supporting rollers, one or more of which are driven, whereas a series of guide rollers are used for acting upon a bead at each edge of the belts, said guide rollers being mounted so as to exert an oblique tension for distending the elastic belts, a couple of pressure members serving to press the belts against one another, said pressure members being placed across the belts at an acute angle to the longitudinal direction of the latter.

Figure 2:
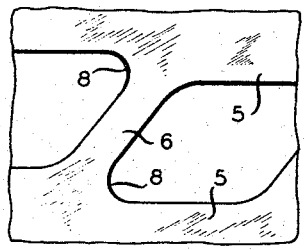
Figure 3:
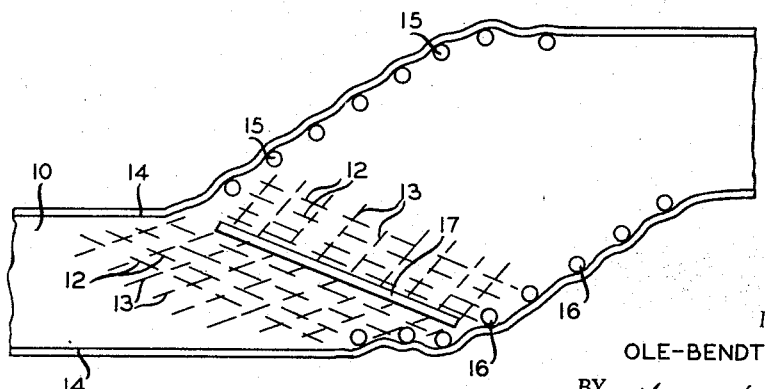

In the following a more detailed description of the invention will be given with reference to the accompanying drawing, wherein FIGURE 1 shows a section of the fiber product of the invention, FIGURE 2 on a larger scale a branch fiber connecting two stem fibers, FIGURE 3, schematically, a view from above of part of an apparatus for use in making the product, and FIGURE 4, on a larger scale, a section through part of the apparatus.

As shown in FIGURE 1, the fiber product of the invention consists of stem fibers 5 being interconnected in pairs by branch fibers 6 which are substantially parallel, being split off from the stem fibers by a series of parallelly displaced splitting lines following the direction of orienting of the starting material, as suggested by the double arrow 7. As will be seen, the branch fibers thus form one-sided scaling downs in opposite directions on the two stem fibers which are interconnected by the said branch fibers.

In the product of FIGURE 1, nothing has been done to prevent further splitting in the notches, where the branch fibers pass into the stem fibers if, during the subsequent use, the material is subjected to mechanical forces of sufficient strength to produce such further splitting.

As stated, however, the material may be subjected to a treatment to prevent further splitting of the said kind, by changing the direction of orienting of the material around the notches 8. A change of this kind can be performed by stretching the fiber product crosswise to the stem fibers at a temperature near the melting point of the material. Thereby, as shown in FIGURE 2, the sharp notch, where a branch fiber 6 passes into a stem fiber 5, will be rounded so that a further splitting is prevented. Preferably, this is done by a one-sided heating, during which the fiber product is kept pressed against a band of elastic material with a rough surface, for example, a rubber belt, the latter being distended while passing under a stationary heating element pressing the fiber product against the rubber belt. The use of a slipping agent, for example talc, ensures that the fiber product slips across the surface of the heating element and is distended together with the rubber belt. By a vigorous, but short heating, the fiber product is heated sufficiently to obtain the desired change of the direction of orienting around the notches without the rubber belt being heated so much as to be damaged.

In some cases, the desired change in the direction of orienting may also be obtained by treating the fiber product with a swelling agent.

Figure 4:
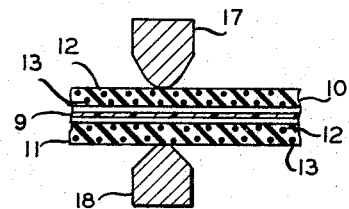

The actual splitting of an oriented film to a fiber product according to the invention may be carried out in the apparatus schematically shown in FIGURES 3 and 4. An oriented film 9 is carried forward while sandwiched between two rubber belts 10 and 11 having incorporated cotton threads 12 and 13 therein. At each edge, the rubber belts have a bead 14 at right angles to the belt, said bead being used for distending the belts by means of rollers 15 and 16 pressing against the beads 14.

Stationary pressure beams 17 and 18 on each side of the two rubber belts are placed at an acute angle to the course of the rubber belts, said beams being pressed against the intervening rubber belts at a pressure, the size of which can be adjusted. The distension of the rubber belts takes place by placing the rollers 15 and 16 so as to exert a tension in the rubber belts at right angles or substantially at right angles to the pressure beams 17 and 18. After the distension, the rubber belts are again allowed to contract as appears from FIGURE 3.

The degree of splitting, and the fineness of the branch fibers 6, depends on a number of factors including the kind of the fiber material and the extent to which microscopic splits or pores have been produced in the film.

By a given starting material, the degree of splitting further depends upon the angle which the pressure beams 17 and 18 form with the path of the rubber belts. The greater degree of splitting is obtained when this angle is 45°, but good results are also obtained when the angle has other values between 30° and 60°.

The incorporated threads 12 and 13 are mono-filaments without any other mutual connection than that of the rubber. The threads are incorporated at acute angles to the longitudinal diretcion of the belts, the said angles being different for the mutually parallel threads 12 and the also mutually parallel threads 13, respectively. The angles are preferably at about 15° for one set of threads, and at about 45° for the other, because this gives particularly good results of the splitting, but the said values are not critical.

The threads assist in distributing the splitting forces evenly over the width of the film, and ensure that a closely defined contraction in the longitudinal direction takes place together with the distension of the rubber belts. As suggested in FIGURE 3, the pressure beams 17 and 18 are preferably mounted so as to be substantially parallel to the one set of threads. It will be noted that the angle between the threads 12 and 13 is changed from about 60° to a substantial right angle during the passage through the nip of the pressure beams, which means that the distance between the threads 13 is increased proportionally to the distending of the rubber belts. The splitting of the oriented film takes place in the pressure zone between the beams 17 and 18.

In order that the friction between the pressure beams and the rubber belts should not be too great, an effective slipping agent is used, for example, a lubricating fat or a silicone base.

The direction of orienting of the film must not coincide with the longitudinal direction of any of the threads 12 or 13. The preferred thread directions mentioned above are appropriate for films which are oriented in the longitudinal direction. Using obliquely oriented films, other thread directions than those hereinbefore mentioned as the preferred ones may give a better result of the splitting process.

Owing to the one-sided scaling down of the branch fibers from the stem fibers, the longitudinal direction of the latter will form a very small angle with the direction of orienting of the material. This angle will depend upon how many and how long branch fibers are split off. By using films which have been oriented in a longitudinal direction, the direction of the stem fibers will not differ much from this direction. By laminating several layers of the fiber product of the invention, for example for use as unwoven textiles, it may be of interest for reasons of strength to have the direction of the stem fibers strongly varying from layer to layer. In that case the fiber product may be produced from an obliquely oriented film and every second layer in the laminate may be turned upside down.

In the following, some examples are given of producing the fiber products of the invention.

Example I

Low pressure polyethylene of a specific weight of 0.96 is mixed with 10 percent by weight of polyisobutylene serving as a plasticizer to improve the properties of the resulting product for textile purposes, as well as serving to promote the formation of microscopic fissures in a cold-stretching process, and a film is extruded, having a thickness of 60μ. The film is subjected to cold-stretching at room temperature until 3.8 times the original length. This results in the formation of numerous microscopic splits or fissures making the film opaque in appearance.

Then the film is stretched at 115° C. in the ratio of 4.0:1. The resulting film has a thickness of 15μ and is extremely easily splitable.

By three passages through the apparatus schematically shown in FIGURES 3 and 4, using a pressure of 10 kg./cm.$^2$ during the first passage between the pressure beams, 6 kg./cm.$^2$ during the second passage, and 4 kg./cm.$^2$ during the third passage, a fiber product is obtained having fine uniformly disposed fibers.

Example II

Polycaprolactam (nylon 6) is extruded to a film of a thickness of 40μ. The film is stretched at 180° C. in the ratio of 4.5:1 and kept in the stretched state at this temperature for 1½ minutes. The thickness is now 18μ, and the film has a marked fibrillar structure, which can be seen in a microscope. The film is split up in three steps by pressures at 6, 4, and 4 kg./cm.$^2$ respectively, a paste of SiO$_2$ in 3 N hydrochloric acid being used as a lubricating agent. The hydrochloric acid, loosening the fibrillar structure, is leached with alcohol directly after the splitting process.

Example III

A film of 40μ thickness, consisting of polyvinyl alcohol, is cast from a solution, acetylenic silver, Ag$_2$C$_2$, in a particle size of 4μ being incorporated in a finely dispersed state in the solution.

The film is stretched in the ratio of 3:1 at 100° C., and then again over a heating element in the ratio of 4:1 at 190° C. By deflagration of the explosive, numerous microscopic splits are formed.

Splitting up is repeated for three times at the pressures specified in Example II. To obtain stableness against water, the split product is tempered in known manner by a heat treatment succeeded by a treatment with formaldehyde.

I claim:

1. A fiber product, having a uniform, branched, netlike structure, and being produced from an oriented film of thermoplastic resin by a partial splitting, said fiber product being characterized by having comparatively long and broad stem fibers, said stem fibers being interconnected by comparatively thin and short branch fibers which have been split off from said stem fibers, said product being further characterized by having a high degree of parallelism of stems and a high degree of parallelism of branches throughout the length and width of said product.

2. The product of claim 1 wherein said thermoplastic resin is polyethylene.

3. The fiber product of claim 1 in which the tendency of continuing the splitting off of the branch fibers from the stem fibers has been eliminated by a changed direction of orientation of the fiber material at the vicinity of the splitting notches.

4. The fiber product of claim 1 having rounded notches at the junctions where the branch fibers pass into the stem fibers.

5. The product of claim 1 wherein said stem fibers form a small angle with the direction of orientation of the resin.

6. Unwoven textile material comprising multiple layers of the product of claim 1.

References Cited

UNITED STATES PATENTS

| | | | |
|---|---|---|---|
| 2,361,369 | 10/1944 | Grebe et al. | 264—146 |
| 2,614,288 | 10/1952 | Chavannes | 264—147 |
| 2,728,950 | 1/1956 | Annesser | 264—147 |
| 2,752,276 | 6/1956 | Woock | 161—109 |
| 2,980,982 | 4/1961 | Coste et al. | |
| 3,003,304 | 10/1961 | Rasmussen. | |
| 3,081,515 | 3/1963 | Griswold et al. | 161—109 |
| 3,137,746 | 6/1964 | Seymour et al. | 264—289 |

ALEXANDER WYMAN, *Primary Examiner.*

EARL M. BERGERT, *Examiner.*

A. J. SMEDEROVAC, R. A. FLORES,
*Assistant Examiners.*